US009542925B2

(12) United States Patent
Le-Hir et al.

(10) Patent No.: US 9,542,925 B2
(45) Date of Patent: Jan. 10, 2017

(54) GENERATING SOUND FOR A ROTATING MACHINE OF A DEVICE

(75) Inventors: Nathalie Le-Hir, Le Mesnil Saint Denis (FR); Gaël Guyader, Chaudon (FR); Patrick Boussard, Eguilles (FR); Benoît Gauduin, Verrieres le Buisson (FR); Florent Jaillet, Chateau-Arnoux (FR)

(73) Assignees: RENAULT SAS, Boulogne (FR); GENESIS, Aix-en-Provence (FR)

( * ) Notice: Subject to any disclaimer, the term of this patent is extended or adjusted under 35 U.S.C. 154(b) by 364 days.

(21) Appl. No.: 14/113,033

(22) PCT Filed: Apr. 4, 2012

(86) PCT No.: PCT/EP2012/056195
§ 371 (c)(1),
(2), (4) Date: Jun. 4, 2014

(87) PCT Pub. No.: WO2012/143244
PCT Pub. Date: Oct. 26, 2012

(65) Prior Publication Data

US 2014/0328498 A1 Nov. 6, 2014

(30) Foreign Application Priority Data

Apr. 19, 2011 (FR) .................................... 11 53377

(51) Int. Cl.
*H04B 1/00* (2006.01)
*G10K 15/02* (2006.01)
*G10H 7/10* (2006.01)

(52) U.S. Cl.
CPC ................ *G10K 15/02* (2013.01); *G10H 7/10* (2013.01); *G10H 2250/211* (2013.01); *G10H 2250/381* (2013.01)

(58) Field of Classification Search
CPC .............................. H04R 2499/13; H04R 3/04
(Continued)

(56) References Cited

U.S. PATENT DOCUMENTS 4,631,747 A * 12/1986 Tardif ...................... G10H 7/06
704/258
7,203,321 B1 4/2007 Freymann et al.
(Continued)

FOREIGN PATENT DOCUMENTS

CN 101366072 A 2/2009
CN 102039050 A 5/2011
(Continued)

OTHER PUBLICATIONS

Notification of the First Office Action issued by SIPO for corresponding Chinese application 201280027317.3, date of notification is Jun. 30, 2015 with English translation.

*Primary Examiner* — Alexander Jamal
(74) *Attorney, Agent, or Firm* — Frommer Lawrence & Haug LLP

(57) ABSTRACT

The invention relates to a method for generating sound for a rotating machine, including a step (E1) of determining the frequencies and amplitudes of n partials and/or harmonics (i) pertaining to the sound of a rotating machine, characterized in that the method includes a step (E2) of determining values (a1) and a step (E7-E8) of calculating a synthetic sound for the rotating machine, said synthetic sound being composed from the n partials and/or harmonics (i), while the frequency thereof is entirely or partially shifted by the values (ai).

14 Claims, 2 Drawing Sheets

(58) Field of Classification Search
USPC .................................... 381/86, 98, 101, 103
See application file for complete search history.

(56) References Cited

U.S. PATENT DOCUMENTS

| | | | | |
|---|---|---|---|---|
| 2008/0192954 | A1* | 8/2008 | Honji .................... | G10K 15/04 381/86 |
| 2009/0136054 | A1 | 5/2009 | Nishimura | |
| 2011/0085674 | A1 | 4/2011 | Fujikawa | |

FOREIGN PATENT DOCUMENTS

| | | | |
|---|---|---|---|
| EP | 1 705 644 | A | 9/2006 |
| FR | 2924260 | A | 5/2009 |
| JP | 2009-063968 | A | 3/2009 |
| WO | WO 02/25628 | A | 3/2002 |

* cited by examiner

| i / N* | $i_1$ | $i_2$ | $i_3$ | $i_4$ | $i_5$ | $i_6$ | $i_7$ | $i_8$ | $i_9$ | $i_{10}$ | $i_{11}$ | $i_{12}$ | $i_{13}$ | $i_{14}$ | $i_{15}$ | $i_{16}$ | $i_{17}$ | $i_{18}$ |
|---|---|---|---|---|---|---|---|---|---|---|---|---|---|---|---|---|---|---|
| | 1 | 1.5 | 2.5 | 3 | 3.5 | 4.5 | 6 | 6.5 | 7 | 7.5 | 8.5 | 9 | 11.5 | 12 | 13.5 | 14.5 | 18.5 | 21 |
| 1000 | 60 | 65 | 60 | 68 | 65 | 45 | 70 | 40 | 55 | 70 | 60 | 70 | 55 | 70 | 70 | 60 | 30 | 65 |
| 1500 | 65 | 70 | 60 | 68 | 66 | 45 | 74 | 60 | 60 | 70 | 69 | 76 | 50 | 72 | 71 | 65 | 40 | 70 |
| 2000 | 70 | 75 | 68 | 68 | 67 | 65 | 76 | 63 | 65 | 75 | 70 | 77 | 64 | 73 | 75 | 64 | 52 | 65 |
| 2500 | 75 | 77 | 76 | 64 | 68 | 60 | 75 | 66 | 70 | 75 | 71 | 79 | 66 | 74 | 78 | 68 | 60 | 63 |
| 3000 | 75 | 77 | 75 | 64 | 57 | 60 | 74 | 65 | 70 | 75 | 70 | 80 | 68 | 76 | 80 | 66 | 65 | 72 |
| 3500 | 73 | 77 | 73 | 68 | 68 | 67 | 76 | 63 | 72 | 73 | 69 | 83 | 66 | 80 | 80 | 70 | 70 | 76 |
| 4000 | 72 | 72 | 70 | 68 | 68 | 66 | 77 | 55 | 72 | 73 | 67 | 80 | 64 | 82 | 80 | 70 | 73 | 76 |
| 4500 | 65 | 70 | 72 | 70 | 70 | 50 | 80 | 55 | 70 | 72 | 66 | 78 | 60 | 80 | 77 | 75 | 65 | 72 |
| 5000 | 65 | 70 | 70 | 70 | 68 | 45 | 76 | 70 | 70 | 72 | 50 | 77 | 69 | 81 | 75 | 70 | 64 | 72 |

Fig.3

| $i_1$ | $i_2$ | $i_3$ | $i_4$ | $i_5$ | $i_6$ | $i_7$ | $i_8$ | $i_9$ |
|---|---|---|---|---|---|---|---|---|
| 1.5 | 3 | 4.5 | 6 | 6.5 | 6 | 7.5 | 9 | 12 |

Fig.2a

| $i_1$ | $i_2$ | $i_3$ | $i_4$ | $i_5$ | $i_6$ | $i_7$ | $i_8$ | $i_9$ | $i_{10}$ |
|---|---|---|---|---|---|---|---|---|---|
| 3.5 | 4 | 6 | 8 | 10 | 12 | 14 | 16 | 18 | 20 |

Fig.2b

| C* | 0 | 20 | 60 | 80 | 100 |
|---|---|---|---|---|---|
| $G_1$ | -20 | -10 | -5 | 0 | 8 |

Fig.4

| V* | 0 | 30 | 50 | 110 | 130 | 150 | 300 |
|---|---|---|---|---|---|---|---|
| $G_2$ | 0 | -2 | -4 | -6 | -12 | -12 | -12 |

Fig.5

GENERATING SOUND FOR A ROTATING MACHINE OF A DEVICE

This application is a 371 of PCT/EP2012/056195 filed on Apr. 4, 2012, published on Oct. 26, 2012 under publication number WO 2012/143244, which claims priority benefits from French Patent Application Number 1153377 filed Apr. 19, 2011, the disclosure of which is incorporated herein by reference.

The invention relates to a method for generating a rotating machine sound, such as the engine of a motor vehicle, of a train, of a helicopter, etc., as well as a method for generating an engine sound in an appliance such as a motor vehicle. It also relates to a sound device generating an engine sound of a motor vehicle using such a method. Finally, it also relates to a motor vehicle equipped with such a sound device.

The advances made in motor vehicles have made it possible to greatly reduce the noise level inside their passenger compartment. The occupants of the vehicle sometimes want to associate a particular sound with the operation of their vehicle, and this reduction of the noise level of the motor vehicles gives them the freedom to impose the sound of their choice.

The document FR2924260 proposes a solution for generating a synthetic sound inside the motor vehicle that takes account of the engine speed and of the position of the accelerator pedal. This synthesis of the sound consists of a conventional method for decomposing the sound of the real engine into different harmonics.

The document WO200225628 elsewhere describes a more complicated method for synthesizing a sound, which incorporates a calculation of a phase associated with each harmonic of the sound, in order to find a reproduction that is as realistic as possible of the real sounds. However, the calculations implemented are complex and incompatible with a real time use in a motor vehicle.

Thus, there is a need for a solution for generating a synthetic sound of a rotating machine such as a motor vehicle engine that makes it possible to achieve a result that is more realistic and/or pleasant and compatible with a real time generation, in a way that is co-ordinated with the real operation of a motor vehicle engine for example.

To this end, the invention is based on a method for generating a rotating machine sound, comprising a step of determining the frequencies and the amplitudes of n relevant partials and/or harmonics in the sonority of a rotating machine, characterized in that it comprises a step of determining values and a step of calculating a synthetic sound of the rotating machine, made up of the n partials and/or harmonics but whose frequency is all or partly shifted by the values.

The invention is more specifically defined by the claims.

These objects, features and advantages of the present invention will be explained in detail in the following description of a particular embodiment given in a non limiting manner in relation to the appended figures in which:

FIG. 1 represents an algorithm of the method for generating an engine sound according to one embodiment of the invention.

FIGS. 2*a* and 2*b* represent tables of harmonics and/or partials i for, respectively, two different types of engines according to one embodiment of the invention.

FIG. 3 represents a table of amplitude values in dB as a function of the harmonics and/or partials and of the engine speed according to one embodiment of the invention.

FIG. 4 represents a table of values of a gain as a function of a desire of the driver according to one embodiment of the invention.

FIG. 5 represents a table of values of a gain as a function of the speed the motor vehicle according to one embodiment of the invention.

Figure 1:
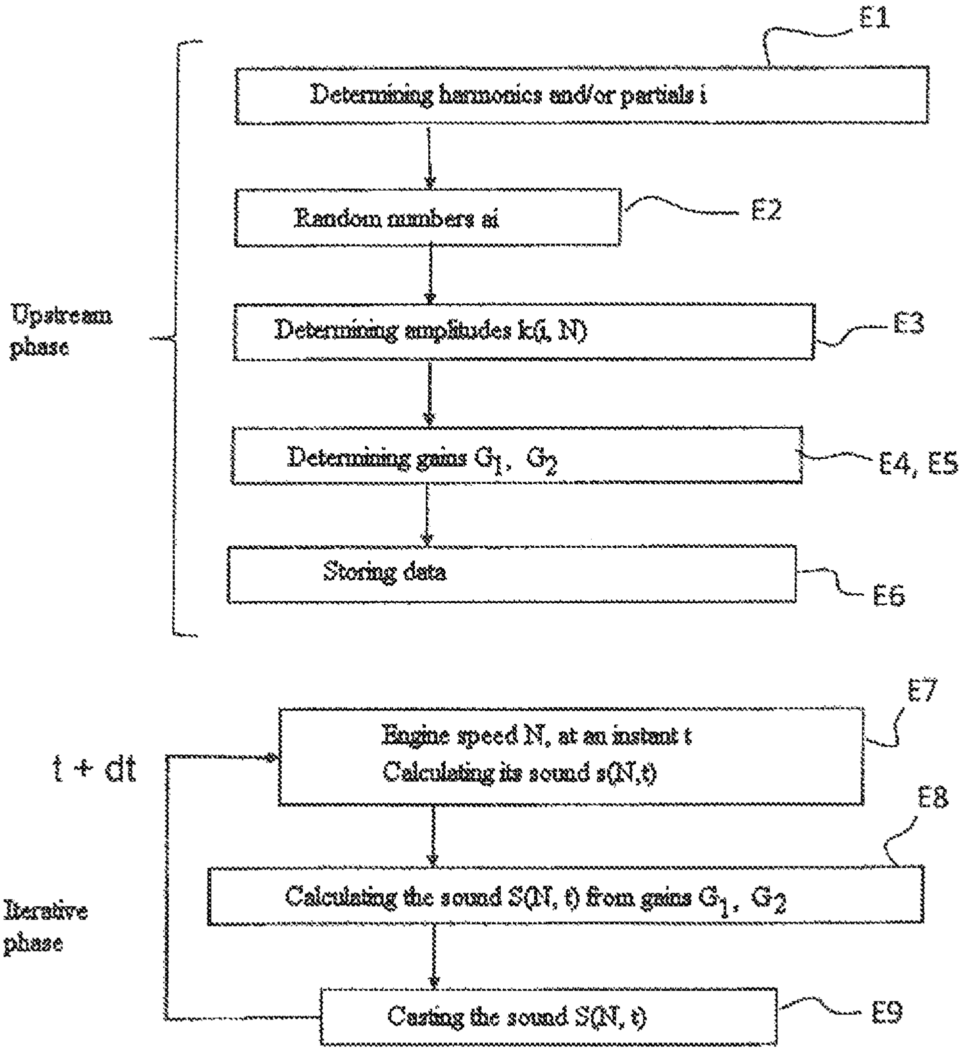

According to one embodiment, the invention is based on a method for generating a sound of a particular engine of a motor vehicle, an algorithm of which, according to one embodiment, is represented in FIG. 1. As a variant, the same method can be used for the generation of a sound of any rotating machine or of a sound of an imaginary machine, which does not really exist. It can be the rotating machine of any appliance, such as a helicopter, an airplane, a train, etc.

The method firstly comprises an upstream phase, of preparation of parameters which will be used to generate the synthetic sound.

This upstream phase comprises a first step E1 of determining a fundamental frequency $f_0(N)$ of the sound of the engine, then of n harmonics and/or partials i ($i_1$ to $i_n$) of the sound of this engine concerned. The sound of the engine is represented by this fundamental frequency $f_0(N)$, which depends generally on its operating speed N, that is to say the rotation frequency of the crankshaft for a motor vehicle engine, then by the frequencies $i \times f_0(N)$, for all the values of selected harmonics and/or partials i. When i is an integer number, the term that applies is harmonic, whereas in the other cases, it is a partial. For example, for a four-stroke engine, all the chosen partials are half-integers. Thus, this step E1 makes it possible to define the frequencies of n harmonics and/or partials that are relevant in the sonority of the machine considered.

As an example, FIGS. 2*a* and 2*b* illustrate solutions of harmonics and partials stored for, respectively, a six-cylinder and a four-cylinder engine. It should be noted that a number of solutions can be provided for one and the same engine, according to different desired renditions. As an example, the table of FIG. 3 represents a more complete choice for a six-cylinder engine. These two solutions for representation of a six-cylinder engine (FIGS. 2*a* and 3) are consistent with one another because they have a large number of harmonics and/or partials in common.

Then, the method comprises a second step E2 that generates any n numbers ai, advantageously between [−0.2; 0.2]. Since these numbers ai can be any numbers, they are defined, for example, by a random generation. However, any other method for defining them may be suitable since they are any numbers.

According to an advantageous variant embodiment, values of ai will be chosen between [−0.1; 0.1].

According to a variant embodiment, fewer than n values ai can be chosen.

According to another variant embodiment, it will be ensured that at least one non-zero value of ai is obtained.

Next, the method comprises a third step E3 of determining a table of reference value data of an amplitude k(i, N*) in dB as a function of the harmonics and/or partials determined in the first step and as a function of certain selected engine speed values N*.

According to a first approach, this third step is performed empirically, recording the real noise of the engine then decomposition. According to second approach, this third step is performed by a simple appraisal, according to artistic criteria.

The method then comprises a fourth step E4 of determining a table of data representing a gain $G_1$ in dB, to take account of the intervention of the driver on the engine.

Notably, account is taken of the position of the accelerator pedal, which represents an important desire on the part of the driver in terms of a vehicle operation. For this, gain values G1 as a function of certain predefined values C* representing an action of a driver are predefined and stored, as illustrated by way of example by the table of FIG. 4.

The method then comprises a fifth step E5 of determining a table of data representing a second gain $G_2$ in dB as a function of predefined speed values V* of the motor vehicle. The table presented in FIG. 5 gives the values retained for this gain as a function of V*, according to this embodiment. This gain makes it possible to reduce the volume of the sound when the speed increases, to achieve a comfortable situation at high speed on a freeway for example.

The method comprises a sixth step E6 of recording the duly obtained values in a memory. These stored data are represented by way of example by the table of FIG. 3.

Then, the method implements an iterative phase, which changes over time. The values defined previously in the upstream phase then remain always constant, and the method is limited to the second iterative phase. As a variant, a choice can be made to modify these values according to defined criteria.

The seventh step E7 comprises the calculation of a synthesized sound s(N, t) of the motor vehicle engine for an instant t and for the speed N of the engine, by the following formula:

$$s(N,t)=\sum_{i=i1}^{i} k(i,N)\times\sin[2\times\pi\times t\times f((i+ai),N)]$$

It should be noted that this step therefore incorporates the measurement or the estimation of a speed N of the engine at the instant t. The amplitude value k(i, N) is obtained by extrapolation of the values predefined in the upstream phase and stored in the data table.

Thus, according to the embodiment of the invention, the frequency of each harmonic and/or partial i is slightly shifted by a random value, that is to say extending in the direction of any value. This calculation of the frequencies taken into account in this calculation of the sound makes it possible to arrive at a more realistic sound, without increasing the complexity of the calculation, which is compatible with an implementation by modest computation devices while allowing for a real time calculation.

According to a variant embodiment, the equation (1) is replaced by the following equation (2), in which a phase $\phi(i)$ is added for each harmonic and/or partial, these phases $\phi(i)$ being previously calculated once for all in any manner, for example randomly, within the range]0; 2π[.

$$s(N,t)=\sum_{i=i1}^{in} k(i,N)\times\sin[2\times\pi\times t\times f((i+ai),N)+\Phi(i)]$$

According to one embodiment, the frequency function f(i, N) is determined by f(i, N)=(N/60)*i, which means that, in the preceding two equations (1) and (2), f((i|ai), N)=(N/60)×(i+ai), in which N/60 represents the speed of the engine in revolution/s.

It should be noted that this embodiment amounts to considering $f_0(N)=N/60$ to be a fundamental frequency of the sound of the engine.

An eighth step E8 of the method consists in considering the gains G1 and G2 in order to finally obtain the retained sound S(N, t):

$$S(N,t)=G_1(C)\times G_2(V)\times s(N,t)$$

The two gain values $G_1(C)$ and $G_2(V)$ are obtained by extrapolation of the values stored in the tables of values defined in the upstream phase.

The steps E7 and E8 are repeated over time, according to a certain predefined time step dt. At each instant t, the method comprises a step E9 of broadcasting the calculated sound.

The sound generation method described above can naturally be subject to variants, without departing from the framework of the invention. Notably, the use of the gains $G_1$ and/or $G_2$ remains optional. Furthermore, the amplitude values k(i, N) can be defined differently.

The method described previously is implemented in a device for generating an engine sound, comprising at least one computer, which implements the steps of the method described previously and which is linked to a sound broadcasting device, which comprises an amplifier coupled to one or more loudspeakers. The computer is also linked to a memory, containing the various data mentioned previously, used to implement the method.

The method for generating the sound of a motor vehicle engine can be implemented in different applications.

Firstly, it can be implemented on board a motor vehicle. For this, the device for generating the sound of an engine is advantageously linked to a communication network on board the motor vehicle, by which it recovers the values of the data representative of the engine speed, of the position of the accelerator pedal, of the speed of the vehicle, and possibly of any actuator of the vehicle or of any other command from the driver and/or of any other quantities representative of the state or of the operation of the vehicle, such as the motor drive type (hybrid, heat, electric, LPG, etc.) of the vehicle and/or such as the torque undergone by the engine to deal with deceleration, etc. The sound broadcaster can be linked to the loudspeakers on board the vehicle, also provided to broadcast the radio for example. Thus, the device for generating engine sound is suitable for emitting an engine sound inside the passenger compartment, perfectly correlated with the real sound of the engine.

In this application, the steps E7 and E8 are repeated very rapidly, according to a very short time step, so as to be able to best follow the variations of the engine, to obtain a synthesized sound best correlated with the real operation of the engine. These steps E7, E8 use a measurement of the engine speed N transmitted periodically to the computer of the sound generator for the application of the equations (1) or (2) of the step E7. As a variant, this transmitted value of the engine speed N can be modified by the computer, according to an interpolation of the latest values retained, in order to obtain a value of the engine speed that varies according to a shorter period, to best follow the variations of the engine. The same approach is applied to the other data taken into account, such as the position of the accelerator pedal.

As a variant, the device for generating engine sound is used in a motor vehicle simulator, so as to reproduce the most realistic engine sound possible.

As a variant, the device for generating engine sound is used to simply create a sound file from data derived from a predefined driving profile of a motor vehicle, comprising data on the speed of the engine, on the depression of the accelerator pedal, etc. In the latter case, the application of the sound generation principle is no longer subject to a real time constraint.

Thus, the solution described previously makes it possible to generate a sound associated with any rotating machine, which can be implemented for uses in real time or not, with devices of digital and/or analog type.

The invention claimed is:

1. A method for generating a rotating machine sound, comprising:

a step (E1) of determining the frequencies and amplitudes of n relevant partials and/or harmonics (i) in the sonority of a rotating machine, comprising:

a step (E2) of determining values (ai); and a step of calculating (E7-E8) a synthetic sound of the rotating machine, made up of the n partials and/or harmonics (i) but whose frequency is all or partly shifted by the values (ai);

wherein the step of calculating a synthetic sound s(N,t) (E7) comprises a calculation defined by the equation:

$$s(N, t) = \sum_{i=i1}^{in} k(i, N) \times \sin[2 \times \pi \times t \times f((i + ai), N)]$$

wherein N is the speed of the rotating machine, t the time, k(i, N) an amplitude in dB, f(i+ai) the frequency associated with the harmonic/partial (i) shifted by the value (ai).

2. The method for generating a rotating machine sound as claimed in claim 1, the method further comprising:

a step (E2) of determining random values (ai) and a step of calculating (E7-E8) a synthetic sound of the rotating machine, from the frequencies determined by the partials and/or harmonics (i) all or partly shifted by the random values (ai).

3. A method for generating a rotating machine sound, comprising:

a step (E1) of determining the frequencies and amplitudes of n relevant partials and/or harmonics (i) in the sonority of a rotating machine, comprising:

a step (E2) of determining values (ai); and a step of calculating (E7-E8) a synthetic sound of the rotating machine, made up of the n partials and/or harmonics (i) but whose frequency is all or partly shifted by the values (ai);

wherein the step of calculating a synthetic sound s(N,t) (E7) comprises a calculation defined by the equation:

$$s(N, t) = \sum_{i=i1}^{in} k(i, N) \times \sin[2 \times \pi \times t \times f((i + ai), N) + \Phi(i)]$$

wherein N is the speed of the rotating machine, t the time, k(i, N) an amplitude in dB, f(i+ai) the frequency associated with the harmonic/partial (i) shifted by the value (ai), $\phi$(i) any phase associated with the harmonic/partial (i), as randomly chosen between [0; 2 $\pi$].

4. A method for generating a rotating machine sound, comprising:

a step (E1) of determining the frequencies and amplitudes of n relevant partials and/or harmonics (i) in the sonority of a rotating machine, comprising:

a step (E2) of determining values (ai); and a step of calculating (E7-E8) a synthetic sound of the rotating machine, made up of the n partials and/or harmonics (i) but whose frequency is all or partly shifted by the values (ai);

wherein the frequency f((i+ai), N) of each harmonic and/or partial (i) is defined by the equation f((i+ai), N)=(N/60)×(i+ai), in which N/60 represents the speed of the rotating machine in revolution/s.

5. The method for generating a rotating machine sound as claimed in claim 1, wherein the values (ai) are contained within the range [−0.2; 0.2].

6. The method for generating a rotating machine sound as claimed in claim 5, wherein the values (ai) are contained within the range [−0.1; 0.1].

7. The method for generating a rotating machine sound as claimed claim 6, the method further comprising:

determining n random values (ai), including at least one non-zero value.

8. The method for generating a rotating machine sound as claimed in claim 1, wherein the n relevant partials and/or harmonics (i) in the sonority of the rotating machine are determined empirically, by a simulator, and/or stored (E6).

9. The method for generating a rotating machine sound as claimed in claim 1, the method further comprising:

a step of determining a gain $G_1$ that is a function of a driver command, such as the position of the accelerator pedal, and/or of a gain $G_2$ as a function of the speed of the vehicle, reference values of these gains being stored, and;

a step of calculating (E8) the synthetic sound by its multiplication by this gain or these gains.

10. The method for generating a rotating machine sound as claimed in claim 1, wherein the method is carried out on board an appliance; and wherein the method comprises:

an iteration of the step of calculating (E7-E8) a synthetic sound of the rotating machine, and;

a step of periodically transmitting the speed N and the position of an actuator of the appliance.

11. The method for generating a rotating machine sound as claimed in claim 10, wherein the appliance is a motor vehicle, rail car, or aircraft, and;

wherein the rotating machine is the engine of the appliance.

12. A device for generating a rotating machine sound comprising:

at least one memory and one computer, which implements the method for generating a rotating machine sound as claimed in claim 1.

13. A motor vehicle, comprising:

a device for generating a rotating machine sound as claimed in claim 12.

14. A motor vehicle simulator, comprising:

a device for generating a rotating machine sound as claimed in claim 12.

* * * * *